July 26, 1932.  G. S. SALZMAN  1,868,543

CLUTCH PLATE

Filed April 3, 1930

INVENTOR.
George S. Salzman
BY
Fay, Oberlin & Fay
ATTORNEYS

Patented July 26, 1932

1,868,543

UNITED STATES PATENT OFFICE

GEORGE S. SALZMAN, OF CLEVELAND HEIGHTS, OHIO, ASSIGNOR TO THE MONMOUTH PRODUCTS COMPANY, OF CLEVELAND, OHIO, A CORPORATION OF OHIO

CLUTCH PLATE

Application filed April 3, 1930. Serial No. 441,235.

This invention relates to a clutch plate, and aims to provide such a plate of simple and strong construction which will be smooth in operation and which will give an even transmission of power throughout its circumference, and on both sides, thereby avoiding uneven wear of the friction surfaces. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
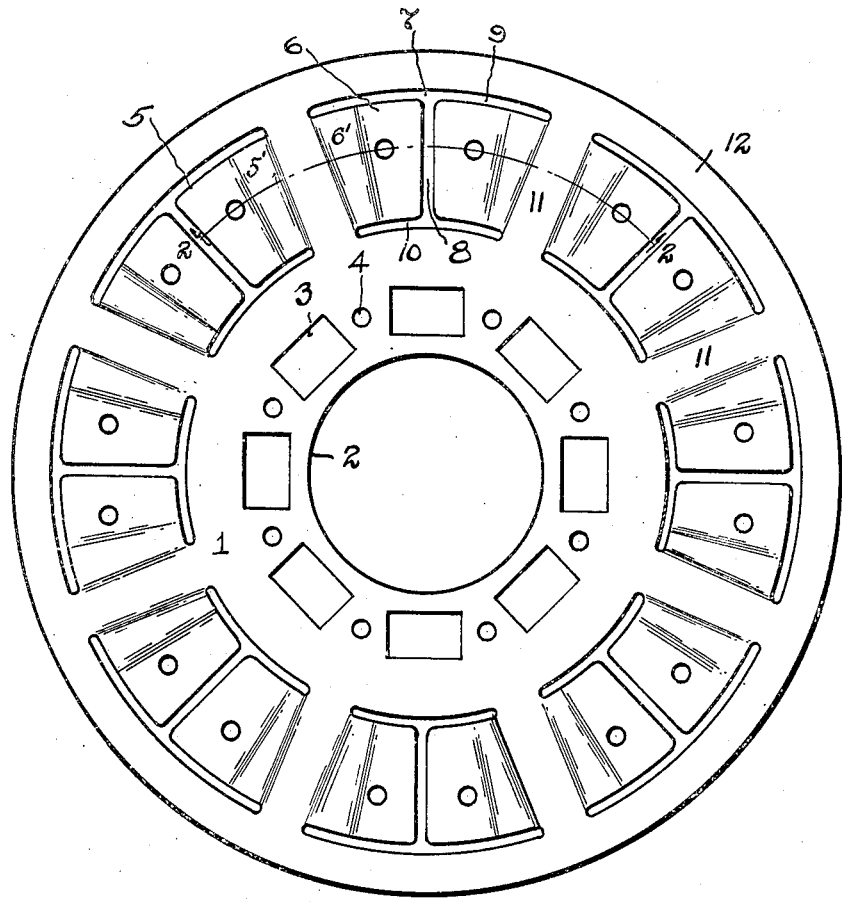
Figure 2:
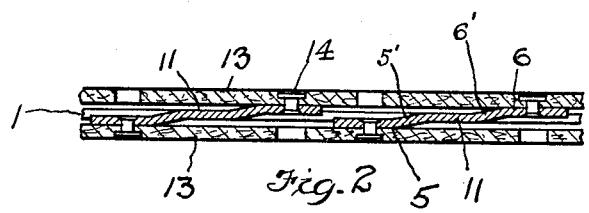

In said annexed drawing:

Fig. 1 is a face view of my improved plate omitting the friction rings; and Fig. 2 is a section taken on the line 2—2 of Fig. 1, showing particularly the arrangement of the tongues.

The clutch plate as shown comprises a flat metal disc 1 centrally apertured at 2 for fitting on a shaft in the usual manner and having additional holes 3 and 4 for use in making up the clutch assembly, as will be readily understood by those skilled in the art. The resilient elements of the clutch comprise circumferentially directed tongues 5, 6, each separated on three sides from the main body of the plate by H-shaped slots 7 so formed and disposed that the cross bars 8 of the H's are radial and the legs 9 and 10 are arcs concentric with the circumference and of equal angular length. These tongues are thus integral on one radial side with the body of the disc and the body portions 11 so remaining may be regarded as spokes in the plate.

A marginal portion 12 of the plate is left outside the longer marginal slots 9, giving rigidity.

Referring now particularly to Fig. 2, it will be noted that the tongues 5 and 6 are bent alternately inward and outward as at 5' and 6' from the spoke portions 11 and are again flattened in parallel relation to, but out of the plane of, the plate body and the spokes 11. Facing material of the usual type is applied as at 13 on each side of the plate and riveted thereto at 14 in the customary manner.

Fig. 2 illustrates the plate with its facings without load. When power is to be transmitted and the load is put on the clutch, the tongues 5 and 6 flatten out between the facings as will be readily understood.

In consequence of the slot construction, and particularly of the elements 8 of the slots, room is allowed for the movement of the tongues 5 and 6 as the plate is flattened without any distortion or uneven arrangement of parts, each tongue being free to contribute its own spring action to the operation of the plate as a whole. It will thus be seen that my clutch is provided with a number of equally spaced bearing surfaces, each of equal resiliency, so that the wear on the facings 13 will be evenly distributed and long life will be assured to the various elements of the clutch.

It will be understood that the exact arrangement of tongues, alternately bent on either side of the spoke sections 11, is not essential to the invention, inasmuch as the purposes could be equally well accomplished by bending two successive tongues in one direction, the next two in the opposite direction, and so on, the principle being that equal areas for the support of the facing must be furnished on each side at equal distances apart. I consider the form of Fig. 2 the most advantageous and as best adapted to meet this requirement, but I do not limit myself thereto.

The use in this specification and in the appended claims of such terms as "radial" and "circumferential" is intended to be descriptive and not limiting, and it will be obvious, for example, that the boundaries of the spokes 11 may be parallel lines which only approximate true geometrical radii and that the slots 9 and 10 may be arcs not truly concentric upon the disc 1, or even might be chords of true arcs of the disc, if so arranged as to size and position that the principle of operation remains the same.

In making up my improved clutch, the ease or stiffness of action, in other words, the resiliency of the plate as a whole, is not entirely dependent on the thickness and the temper of the metal, but within stock of equal thickness and temper may be varied by the amount of bend applied at base portions 5' and 6' of the tongues, the stiffness of course increasing the more sharply these base portions are inclined.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A clutch plate comprising a plurality of pairs of tongues, each pair being defined by an H-shaped slot, said slot being disposed with the bar element of the H radial, said tongues being offset alternately on opposite sides of the plane of the plate.

2. A clutch plate comprising a plurality of pairs of tongues, each pair being defined by an H-shaped slot, said slot being disposed with the bar element of the H radial, said tongues being offset in equal numbers on opposite sides of the plane of the plate.

3. A clutch plate comprising a plurality of tongues joined to said plate on substantially radial lines and separated therefrom by one radial and two circumferential slots, said tongues being at least as long radially as circumferentially, said tongues extending beyond the plane of the plate, an equal number of such tongues being disposed on either side of such plane, and continuous facing rings secured to the offset portions only of said tongues separately on each respective side.

4. A clutch plate comprising a plurality of circumferentially directed tongues offset from the plane of the plate, and a plurality of parallel sided radial spokes, said tongues having their ends remote from said spokes free and extending in opposite circumferential directions, said plate including an integral circumferential ring outward of said tongues, said ring being joined to said plate by said spokes.

5. A clutch plate comprising in combination a plurality of tongues joined to said plate back to back by substantially radial joining portions and separated therefrom by two concentric slots, a radial slot connecting said circumferential slots at their mid length, said plate including an integral circumferential outer ring, prolongations of said joining portions.

6. A clutch plate comprising a plurality of circumferentially directed tongues offset from the plane of the plate and a pair of continuous friction facing rings secured to the offset portions only of said tognues.

7. A clutch plate comprising a plurality of circumferentially directed tongues offset from the plane of the plate, a plurality of parallel sided radial spokes, said tongues having their ends remote from said spokes free, and a pair of continuous friction facing rings secured to the end portions only of said tongues.

8. A clutch plate comprising a plurality of circumferentially directed tongues offset from the plane of the plate, and a plurality of parallel sided radial spokes, said tongues having their ends remote from said spokes free, and extending in opposite circumferential directions, said plate including an integral circumferential ring outward of said tongues, said ring being joined to said plate by said spokes, and continuous friction facing rings secured to the end portions only of said tongues.

9. A clutch plate comprising in combination a plurality of tongues joined to said plate back to back by substantially radial joining portions and separated therefrom by two concentric slots, a radial slot connecting said circumferential slots at their mid length, said plate including a circumferential outer ring integral with prolongations of said joining portions, and continuous friction facing rings secured to the end portions only of said tongues.

Signed by me this 28th day of March, 1930.

GEORGE S. SALZMAN.